Oct. 22, 1957 G. SATZINGER 2,810,339
CHOPPING AND PRESSING MECHANISM ATTACHABLE
TO A MEAT CHOPPING MACHINE
Filed July 22, 1953 2 Sheets-Sheet 2
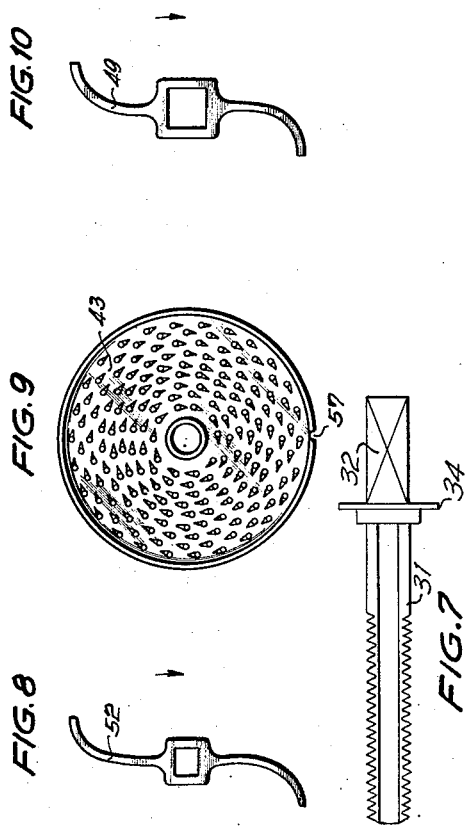
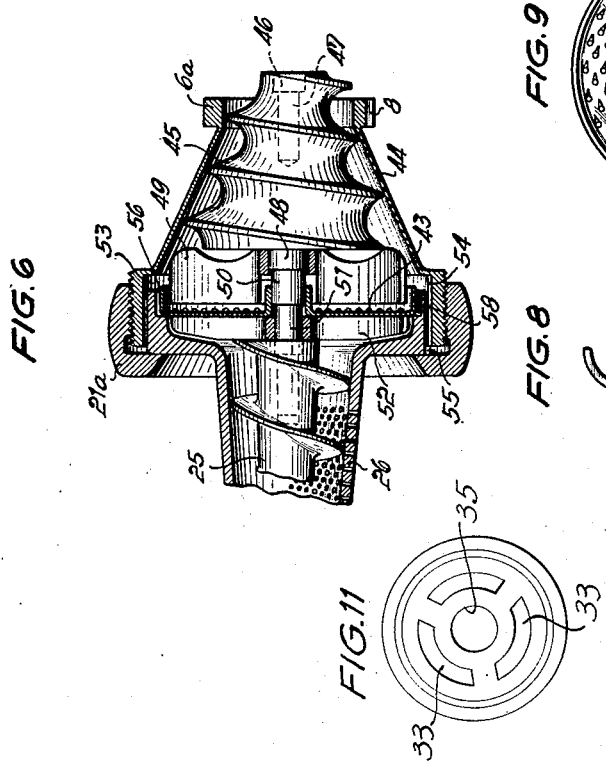
INVENTOR
GEBHARD SATZINGER
BY
Greene, Pineles and Durr United States Patent Office 2,810,339
Patented Oct. 22, 1957

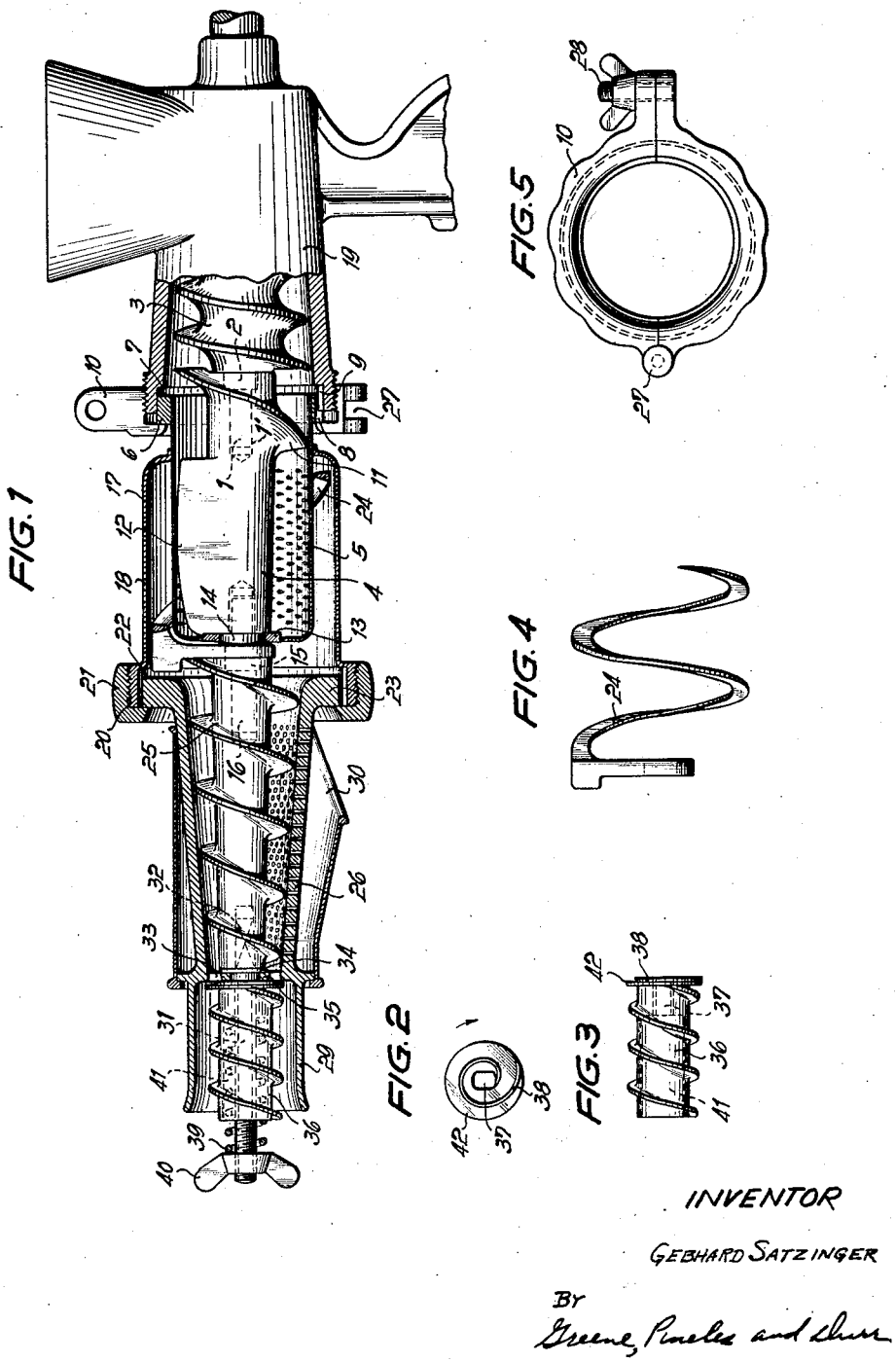

2,810,339

CHOPPING AND PRESSING MECHANISM ATTACHABLE TO A MEAT CHOPPING MACHINE

Gebhard Satzinger, Bad Kissingen, Germany

Application July 22, 1953, Serial No. 369,601

Claims priority, application Germany July 31, 1952

4 Claims. (Cl. 100—97)

The invention relates to a chopping and pressing mechanism that may be attached to a customary meat chopping machine for manual or power operation instead of the knife and perforated disc of such a meat chopping machine.

To press juice out of bulbous plants, of roots, of herbs and so on, one formerly had to reduce these plants to small pieces by means of chopping or grating machines. Only then could one obtain the juice of the triturated fruit by means of a pressing mechanism. By this tedious procedure, the pressed fruit was influenced disadvantageously by the interweaving of oxygen; for instance, one will observe the changing of grated raw potatoes into a dark hue after only a few minutes. Fresh or undecomposed juices of bulbous fruit, roots, herbs, and so on have maximum health values.

Thus, the problem was to invent a mechanism as an appliance to the meat chopping machine that reduces the bulbous fruit, roots, and herbs to small pieces during the manipulating process and squeezes out the juice, simultaneously, as said, fruit, roots or herbs pass therethrough. This chopping and pressing mechanism consists of a grater applied to the meat chopping machine instead of a knife and perforated disc. The grating contrivance is connected to the pressing mechanism. As there are also sappy products that one cannot grate, it is desirable to provide for the substitution of a cutting mechanism instead of a grater. When the chopping and pressing contrivances are connected it is necessary to construct both mechanisms for trouble-free service. It is also necessary to prevent any check of the output of the residue. Therefore, breaches or escape apertures are provided for the outlet of the residue around the bearing of the pressworm. These breaches are covered by a turning spiral strip elastically pressing against the breaches. The residue then is carried forth radially by the aid of the spiral strip. To also carry away the residue parallel to the axle, there is also provided, besides the pressure or thrust disc with the spiral strip, a discharging worm for clearing off the residue, operating also parallel to the axle.

In the drawing you will find diagrams for the execution of the invention:

Fig. 1 is a cross-sectional side view of a meat chopping machine with applied grater and press mechanism.

Fig. 2 is a view of a thrust disc with the spiral strip of the residue removing worm, Fig. 3 is a side view of the residue removing worm, Fig. 4 is a view of the scraping and transporting worm, Fig. 5 is a view of the divided band nut, Fig. 6 is a side cross-sectional view of a connected grater and pressing mechanism with a disc shaped striking surface, Fig. 7 is a detail view of a bolt employed in the device, Fig. 8 is an end view of the scraping for the disc shaped striking surface or perforated disc, Fig. 9 is a view at the striking surface of a perforated disc, Fig. 10 is an end view of the transporter for the striking disc, Fig. 11 is a detail view of an outlet means employed in the device.

The grater and press mechanism comprise the features illustrated in Fig. 1. The conventional knife and perforated disc are taken off the meat chopping machine. The conveyor 4 contains an axial opening 1' extending inwardly from one end thereof by which it is fixed on the bearing bolt or bush 1 and square bar 2 of the winding worm 3. Around the conveyor is the grater mantle 5. With the help of a locking shim 6 attached to the grater mantle 5 and which lies in the space 7 which is ordinarily the seat of the perforated disc of the meat chopping machine, the grater mantle 5 is fixed by the band nut 10, whereby a key-way 8, placed in the locking shim 6, embraces the fixing pin 9. The conveyor may comprise one or more portions, 11 and 12, for example. The blade portion adjacent the worm 3 is the feed blade 11. This blade is constructed to bring the fruit speedily to the grater mantle 5 and has a somewhat quicker winding effect than the winding worm 3 of the meat chopping machine. By this construction none of the juice being recovered from the sappy fruit in the meat chopping machine will be detained. The grating blade 12 rotates in the cylindrical opening of the grater. This blade rotates the fruit to be grated over the grater mantle 5. The grater blade 12 has a slightly spiral shape. The reason for this is to distribute the fruit equally within the space of the grater mantle 5. The feed blade 11 and the grating blade 12 are not continuous but are fixed opposite each other on the conveyor axle. The conveyor 4 rotates in the bearing 13 which is mounted in the grater mantle 5. Near the bearing journal 14 of the conveyor the square bar 15 is positioned. The square bar 15 at its farther end takes the form of a cylindrical bolt 16, similar to the square bar 2 with bearing bolt 1 attached to the winding worm 3. The interspace 17 is formed between the grater mantle 5 and the casing 18.

The casing 18 may be fixed to the grater mantle 5 at one end and connected to the pressing mechanism at the other end. The casing 18 has the external thread 20 for the purpose of attaching the band nut 21. The space 22 holds the locking shim 23 of the pressing mechanism. The press worm is connected and attached to the grater mechanism in the same way as conveyor 4 is attached to a meat chopping machine. However, on the square bar 15, a residue scraping and transporting worm 24 rotating between the casing and grater mantle is located. By the rotation of the scraping and transporting worm 24 the grated fruit is stripped off the grater mantle and carried away in the direction of the pressing mechanism. Annexed to this mechanism is the thrust worm 25 fixed to the square bar 15; and around it is the strainer casing 26 tightly connected to the casing 18 of the grater mechanism through the band nut 21. As the casing 18 has a larger diameter than the grater mantle 5, the band nut 10 had to be divided and can be opened on one side by the joint 27. Thus, the band nut 10 of the chopping and pressing mechanism here in question is opened, brought over the locking ring 6, and held together by the bolt 28. The grater and press mechanism is fixed on the casing of the meat chopping machine by the divided band nut 10.

To collect the juice which runs through the strainer casing from the residue outlet 29 as far as possible, there has been provided on the pressing mechanism an adjustably mounted juice outlet contrivance 30. This contrivance 30 may be made of transparent material. Held by the bolt 31, the press worm 25 rests in strainer casing 26. The bolt 31 may be tightly connected to the press worm, or it may be formed as a square bar 32, as long as it is attached to and rotates with the press worm 25.

The residue is pressed by the press worm 25 through the two or more breaches or openings 33, which have been arranged round the bearing in the casing, the end of the press worm passing across the outlet means 33 (see Fig. 11) at each turn. The bolt 31 is held in position in the opening at the end of the press worm 25 by a thrust bearing means 34 on said bolt which is adapted to rotate against the surface of bearing 35 held in casing 26. Beyond the bearing in the direction toward the residue outlet the bolt 31 is flattened at two opposite sides (see Fig. 7). To this flattened bolt is connected a residue discharging worm 36 which has a bore hole 37 that is not cylindrical so as to fit on the laterally flattened bolt. The residue discharging worm 36 which clears away the residue, is provided with a spiral strip 38 on that side where it has a thrust washer 42. This spiral strip abuts the openings 33. The spring 39 is arranged between the winged nut 40 and the residue discharging worm 36 and presses the said worm against the openings 33. The thrust of the spring can be adjusted in any way by tightening or loosening the winged nut 40. The residue which in this way presses through the discharge opening against the thrust plate of the residue discharging worm 36 which is provided with a spiral strip 38, pushes the residue discharging worm toward winged nut 40. By the fact, however, that the thrust washer of the residue discharging worm possesses the spiral strip 38, the residue will be caught by this face thread through the rotations of the residue discharging worm and will be carried away radially toward the residue outlet 29. Then the residue is seized by the residue discharging worm and forwarded in the same direction. In this way accumulations of residue are prevented. The residue will be forcibly cleared away by the residue discharging worm. By the adjustable spring thrust which counteracts the residue pressure, an absolutely symmetrical and thorough extraction of the residue from juice will be obtained.

Instead of a mantle shaped grater a disc shaped one may be applied also. The disc shaped grater 43 (see Figs. 6 and 9) has a diameter of such a size that it presents quite a lot of holes and grater teeth and, therefore, is able to grate as many plants as the winding worm 3 of the meat chopping machine is able to carry away. A casing 44, expanding in the winding direction, which bears the locking ring 6a for the insertion into the seat 7 for the perforated disc of the meat chopping machine, forms the casing for the additional worm 45 which is fitted to the interior of the casing. This additional worm 45 bears the square hole 46 and, likewise, the cylindrical hole 47 and therefore, is coupled for co-rotation with the square bar 2 and the bearing bolt 1 of the winding worm 3. At the other end of the expanding additional worm 45 there is the square bar 48 for the reception of the conveyor 49, rotating with the additional worm 45, and having annexed thereto the cylindrical bearing bolt 50, and farther on the square bar 51, on which is fixed the scraper 52 and the feeder for the thrust worm. The square bar 51 also holds the thrust worm 25, serving as a coupling and causing co-rotation of the thrust worm, transporter 49 and scraper 52. The fruit to be grated is taken over by the thrust worm 45 and conducted to the conveyor 49. The conveyor rotates the fruit so that the fruit revolves against the disc shaped grater. The scraper 52 scrapes the grated fruit off the grater disc and carries it forward in the direction of the axle where it is taken over directly by the thrust worm 25. The rest of the operation follows as described in connection with Fig. 1. The press mechanism is held in the space 53 by the band nut 21a.

In the space 53 of the casing 44 there is the locking or fixing pin 54 which catches the key-way 55 and secures the casing of the press against co-rotation. In the space 56 of the press casing, there is the reception seat for the disc shaped grater 43 which is secured against co-rotation by the key-way 57 that takes hold of the locking pin 58. The grater mechanism with disc shaped grater is fixed by the divided band nut 10 (illustrated in Fig. 5) onto the casing of the meat chopping machines that are commonly sold for manual or power operation as already described.

I claim:

1. A grating and pressing attachment for a meat chopping machine of the type having a rotatable worm, said attachment comprising a first worm feeding means, a second worm means attached to the first worm means, said first worm feeding means having an axial opening at one end thereof adapted to interfit with a portion of the rotatable worm of said chopping machine to rotate therewith and having means at the opposite end adapted to interfit axially with said second worm means, a perforated grating means intercepting the path defined by the first and second worm means so that material fed from said chopping machine is forced by said first worm means through said perforated grating means before reading said second worm means, scraping means mounted adjacent an end of one of said worm means to rotate therewith for moving material away from the outside surface of said grating means, a perforated juice extracting means, surrounding the periphery of said second worm means, and means to hold said grating means and said perforated juice extracting means stationary while said worm means rotate.

2. A grating and pressing attachment for a meat chopping machine of the type having a rotatable worm, said attachment comprising a first worm feeding means, a second worm means attached to the first worm means, said first worm feeding means having an axial opening at one end thereof adapted to interfit with a portion of the rotatable worm of said chopping machine to rotate therewith and having means at the opposite end adapted to interfit axially with said second worm means, a perforated grating means intercepting the path defined by the first and second worm means so that material fed from said chopping machine is forced by said first worm means through said perforated grating means before reaching said second worm means, scraping means mounted adjacent an end of one of said worm means to rotate therewith for moving material away from the outside surface of said grating means, a perforated juice extracting means surrounding the periphery of said second worm means, means to hold said grating means and said perforated juice extracting means stationary while said worm means rotate, said juice extracting means comprising an opening adjacent the end of the second worm means for the discharge of pulp therefrom, and spring pressed closure means adapted to releasably close the said last mentioned opening whereby substantially juice-free pulp is discharged as the pressure on the same produced by said second worm means is sufficient to overcome the pressure on the spring pressed closure means.

3. The device as claimed in claim 1 in which said grating means is in the form of a cylinder surrounding said first worm means, a cylindrical housing surrounding and concentric with said cylindrical grating means, said scraping means comprising a scraping and transporting worm adapted to rotate in the space between the cylindrical grating means and the cylindrical housing, and means adjacent the end of the first worm means for connecting the scraping and transporting worm to the former to rotate therewith.

4. The attachment as set forth in claim 1 in which said perforated grating means is a disk positioned at the delivery end of said first worm means.

(References on following page)

References Cited in the file of this patent

UNITED STATES PATENTS

| | | |
|---|---|---|
| 154,235 | Firey | Aug. 18, 1874 |
| 488,956 | Sobotka | Dec. 27, 1892 |
| 647,354 | Anderson | Apr. 10, 1900 |
| 1,146,656 | Rogers | July 13, 1915 |
| 1,683,705 | Schmidt | Sept. 11, 1928 |
| 1,855,369 | Tessandori | Apr. 26, 1932 |
| 1,999,241 | Kiergard | Apr. 30, 1935 |
| 2,042,161 | Satzinger | May 26, 1936 |
| 2,051,554 | Gasser | Aug. 18, 1936 |
| 2,323,747 | Zetterstrom | July 6, 1943 |
| 2,513,974 | Thomas | July 4, 1950 |

FOREIGN PATENTS

| | | |
|---|---|---|
| 445,426 | Germany | June 11, 1927 |
| 695,211 | France | Sept. 29, 1930 |